March 15, 1966  E. LUDWIG  3,241,034
COMBINED TRANSDUCTOR AND SEMICONDUCTOR RECTIFIER PLANT
Filed June 22, 1962  2 Sheets-Sheet 1

INVENTOR.
Ernst Ludwig
BY
Pierce, Scheffler & Parker
attorneys

March 15, 1966 E. LUDWIG 3,241,034
COMBINED TRANSDUCTOR AND SEMICONDUCTOR RECTIFIER PLANT
Filed June 22, 1962 2 Sheets-Sheet 2

INVENTOR.
Ernst Ludwig
BY
Pierce Schiffler & Parker
Attorneys

United States Patent Office 3,241,034
Patented Mar. 15, 1966

3,241,034
COMBINED TRANSDUCTOR AND SEMICONDUCTOR RECTIFIER PLANT
Ernst Ludwig, Mannheim-Lindenhof, Germany, assignor, by mesne assignments, to Aktiengesellschaft Brown, Boveri & Cie, Baden, Switzerland, a joint-stock company of Switzerland
Filed June 22, 1962, Ser. No. 204,339
Claims priority, application Germany, June 24, 1961, B 63,021
8 Claims. (Cl. 321—8)

The present invention relates to rectifier plants of the semi-conductor type and particularly such plants as include transductors for controlling the rectifiers.

Figure 1:
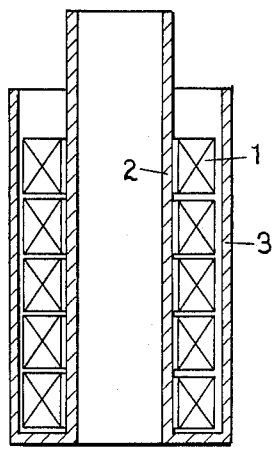
FIG. 1 is a vertical central section through a transductor of conventional design.
Figure 2:
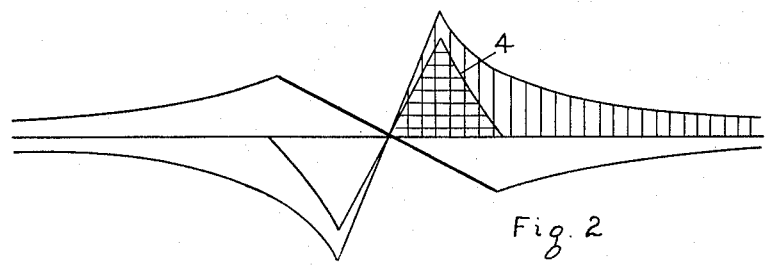
FIG. 2 is a graph of the magnetic field associated with the transductor of FIG. 1.

Semiconductor rectifier plants, particularly for large powers, nearly aways use additional transductors (magnetic amplifiers) for regulating the direct voltage output in addition to regulating transformers. These transductors are premagnetized in a manner known per se by way of a regulator in such a way that they require a more or less large voltage-time area during commutation between two phases of the rectifier system. Out of consideration for as large a regulating range as possible it is desirable that the voltage-time area of the transductors should be reduced from the maximum value, which depends on the iron cross-section and number of turns, to as small a value as possible. The minimum value of the voltage-time area or the residual inductance of the transductor with full magnetization of its iron in the preferred direction depends on the kind of iron and the constructional form. Particularly low residual inductances are obtained when the transductors are constructed according to the so-called bottle-type design shown in FIG. 1. The individual annular cores 1 of the transductor are arranged in coaxial layers. The winding consists also of coaxially arranged winding cylinders 2 and 3 which completely enclose the individual cores. FIG. 2 shows the diagram of the resultant magnetic field 4 and it will be noted that due to the concentric construction of the transductor it is zero outside the outer cylinder. This is the reason why with such a construction when the iron is saturated it has a very low residual inductance.

With semiconductor plants for high currents with a large number of diodes arranged in parallel, special measures have to be taken to obtain a distribution of the current amongst the diodes which is as uniform as possible. No such special measures are necessary in this respect when cylindrical-symmetrical conductor systems are used for the arrangement of the diodes with respect to the current conductors. Such diode arrangements are known per se. Between the transductors and the semiconductors, which are generally located in a cubicle, a conductor has to be provided that conducts the current from the transformer terminals to the diodes by way of the transductors. This conductor has an inductance which can be calculated in and in the same way as the residual inductance of the transductors reduces the available voltage with full modulation. This conductor inductance must be kept as small as possible, special conductor arrangements being suitable for this purpose.

The purpose of the invention is to eliminate the harmful effects of the conductor inductance resulting from the spatial separation of the transductors and semiconductor diodes, and at the same time to utilize the advantages of the bottle-type construction for transductors. The invention concerns a constructional unit consisting of a semiconductor rectifier set and transductor with coaxially arranged winding cylinders and is characterized by the feature that the rectifier set consisting of a plurality of parallel-connected individual diodes forms part of the outer winding cylinder in such a manner that the winding cylinder has an annular gap which is bridged over by the uniformly distributed diodes.

Figure 3:
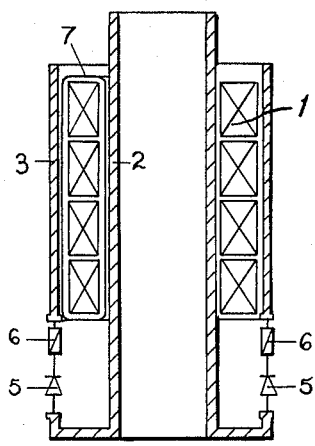
FIG. 3 is a vertical central section of a transductor constructed in accordance with the invention to include a plurality of parallel connected semiconductor diodes.

With reference now to FIG. 3, the transductor structure includes concentric inner and outer cylindrical conductors 2 and 3 connected in series to establish the primary of the transductor structure. Located in the annular space between the concentric cylinders 2 and 3 are a plurality of annular cores 1 and a secondary winding 7 is wound on these cores.

As shown in FIG. 3 the outer cylinder 3 of the transductor primary of bottle-type design with only one turn is cut open at a point and the diodes 5, arranged in the form of a ring, are inserted in the gap. In addition, each diode 5 can have a fuse 6 connected in series with it without affecting the basic arrangement. The current passes to the inner winding cylinder 2 and leaves at the outer winding cylinder 3. The current path thus has a turn around the iron of the transductor, the parallel-connected semiconductors forming part of this single-turn current path. Windings 7 consisting of thin wires are arranged on the transductor iron and these enable the magnetization of the iron as a secondary for the transductor to be varied for the purpose of regulation.

Figure 4:
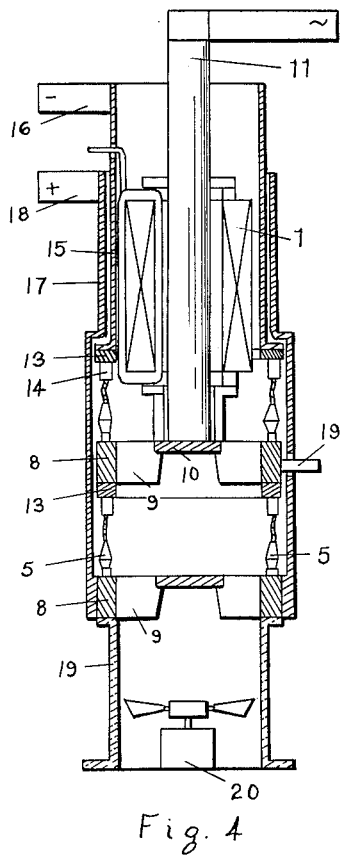
FIG. 4 is also a vertical central section of another embodiment for a structurally combined transductor and parallel connected semiconductor diodes arranged in bridge connection.

The constructional form when the idea according to the invention is extended to two diode branches, is explained by means of FIG. 4. The diodes 5 are arranged along the periphery of a disc-shaped element 8 which towards the centre is provided with radial cooling ribs 9. In the centre there is a smaller disc 10 to which the inner winding cyinder in the form of a central current conductor 11 is connected. Located around this conductor are the annular cores 1 of the transductor iron, generally of a material with rectangular hysteresis loop, and these cores are held in position by suitable spacers and fixing elements.

Spaced from the disc 8 by means of four insulating columns 12 (FIG. 6) is a further conductive ring 13. The diodes 5 and possibly also the fuses 14 are located between the rings 8 and 13 as vertical connecting elements.

The winding cylinder 15 is screwed to the upper ring 13, this cylinder extending beyond the upper end of the transductor iron in order to compensate the outer field of the inner conductor 11. A current lead 16 is provided at the top of the cylinder.

Figure 6:
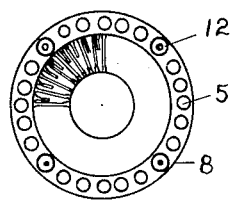
FIG. 6 is a plan view of the cylindrical array of semiconductor diodes incorporated in the transductor structure.

Two cage-like rectifier sets consisting of cooling rib discs 8, metallic ring 13, spacing columns 12, diodes 5 shown in plan in FIG. 6, are superimposed one above the other. In this way there are two groups of parallel-connected diodes which are connected in series. Both groups form the double branch of a bridge connection. An outer winding cylinder 17 possibly also provided with an opening extends upwards from the bottom ring 8. It also surrounds the transductor iron and has a current lead 18 at the upper end. An opening for the terminal 19 of a short-circuiting device is provided in the middle.

Figure 5:
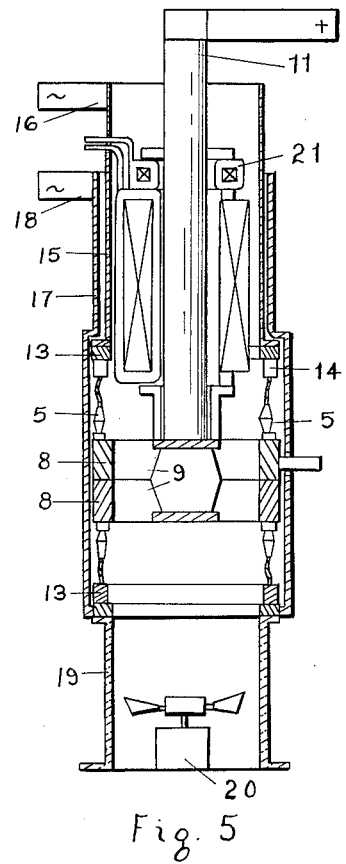
FIG. 5 is a view similar to FIG. 4 showing another embodiment especially designed for an interphase transformer.

If in accordance with FIG. 5, the lower cage-like diode group of FIG. 4 is inverted, this being possible due to its symmetrical arrangement, both groups of diodes are then in parallel. The entire arrangement when the transformer phases are connected to the rings 13 thus forms two phases of an interphase transformer connection which are displaced by 180 electrical degrees.

The arrangements shown in FIGS. 4 and 5 are mounted on a cylindrical base piece 19 made of insulating material. A fan 20 can be located inside this base piece 19 for the purpose of forcing cooling air between the cooling ribs 9 of the diode rings 8 and conducting away the heat in the transductor iron.

The direct-current transformers for measuring the actual value of the regulator in connection with the regulation of the direct current output, can be readily located in the space above the transductor cores 1. They have about the same dimensions as the transductor cores and can therefore be mounted on the top of the transductor and attached to it. They use the same current conductor 11 as primary lead. The current transformer core ring and secondary winding thereon are indicated at 21 in FIG. 5.

The arrangement according to the invention has the following advantages:

The inductance of the alternating-current supply lead is reduced to a minimum because the constructional unit can be located in the immediate vicinity of the transformer and the connections are thus as short as possible. The connections between transductor and rectifier cubicle are eliminated. The residual inductance of the transductors at full output is reduced to the physically possible minimum due to the concentric arrangement of the inner and outer conductors with the bottle-type design. Due to the reduction of inductance in the alternating-current conductors, the voltage drop of the rectifier on load is smaller, so that the power of the main transformer is reduced correspondingly. The current distribution amongst the semiconductor diodes is assured solely by the cylindrical symmetry of the winding arrangement without any special extra devices. The symmetrical design of the diode groups enables the interphase transformer or bridge connection to be established by a simple rotation of one of the groups. At the same time the ratio of the current density in the central conductor to that in the diode rings or in the outer winding cylinders remains the same in both cases. This enables the conductor material to be utilized to a maximum extent, independently of the arrangement of the connections. By providing a cylindrical base piece of insulating material it is possible to use this element as an insulator and base piece and for guiding the air flow. Moreover, with the arrangement according to the invention, by providing different numbers of annular cores 1 on the central conductor 11, the voltage-time curve and thus also the regulating range of the transductor reactors can be adjusted in a most simple manner to suit the requirements of the plant. It is not necessary to construct special transductors for each particular case.

The direct-current transformers required for the regulation can be combined with the constructional unit in a compact manner so that special holding devices for the conductors are unnecessary.

I claim:

1. In a rectifier plant, the combination comprising a rectifier set constituted by a plurality of parallel-connected individual semiconductor diodes and a transductor unit connected in series with said diodes, said transductor unit being constituted by coaxially arranged inner and outer conductor cylinders connected in series to form a two turn primary winding, and cores with a secondary winding thereon located between said cylinders, said outer cylinder including a circumferential gap, and said diodes being arranged in a circular array in uniform circumferentially spaced relation in said gap and forming part of and being connected to said outer cylinder.

2. A rectifier plant as defined in claim 1 and which further includes a current transformer ring core arranged coaxially with said transductor core and located between said inner and outer conductor cylinders, and a secondary winding on said current transformer core, the primary of said current transformer being constituted by said inner conductor cylinder which passes through said current transformer cores.

3. In a rectifier plant, the combination comprising a transductor unit constituted by coaxially arranged inner and outer conductor cylinders connected in series to form a two turn primary winding and a core having a secondary winding thereon located between said cylinders, said outer cylinder including a circumferential gap, a first circular set of parallel connected individual semiconductor diodes having first and second terminals arranged in said gap and each being connected at the first terminal thereof to said outer conductor cylinder, the second terminals and said diodes themselves being connected to the outer portion of a first disc having radially extending spaced cooling ribs, the inner portion of said disc being connected to said inner conductor cylinder, a second circular set of parallel connected individual semiconductor diodes having first and second terminals arranged concentrically with and spaced from said first set of diodes, the first terminals of said second set of diodes being connected to the outer portion of said first disc, the second terminals of said second set of diodes and said diodes themselves being connected to the outer portion of a second disc having radially extending spaced cooling ribs.

4. A rectifier plant as defined in claim 3 and which further includes another conductor cylinder surrounding and connected to the outer portion of said second disc and which also surrounds at least a portion of said outer conductor cylinder.

5. A rectifier plant as defined in claim 3 and which further includes a base supporting said sets of diodes and discs, and a fan located within said base for blowing cooling air through the spaces between the ribs of said discs and through the circular sets of diodes.

6. In a rectifier plant, the combination comprising a transductor unit constituted by coaxially arranged inner and outer conductor cylinders connected in series to form a two turn primary winding and a core having a secondary winding thereon located between said cylinders, said outer cylinder including a circumferential gap, a first circular set of parallel connected individual semiconductor diodes having first and second terminals arranged in said gap and each being connected at a first terminal thereof to said outer conductor cylinder, the second terminals and said diodes themselves being connected to the outer portion of a first disc having radially extending spaced cooling ribs, the inner portion of said disc being connected to said inner conductor cylinder, a second disc having radially extending spaced cooling ribs arranged adjacent said first disc and having its inner portion connected to the inner portion of said first disc, a second circular set of parallel connected individual semiconductor diodes having first and second terminals arranged concentrically with and spaced from said first set of diodes, the second terminals of said second set of diodes corresponding electrically to the second terminals of said first set and being connected along with the diodes themselves to the outer portion of said second disc, and the first terminals of said second set of diodes being connected together.

7. A rectifier plant as defined in claim 6 and which further includes an outermost conductor cylinder surrounding said second set of diodes and which also surrounds at least a portion of said outer conductor cylinder, the first terminals of said second set of diodes being connected to said outermost conductor cylinder.

8. A rectifier plant as defined in claim 6 and which further includes a base supporting said sets of diodes and discs, and a fan located within said base for blowing cooling air through the spaces between the ribs of said discs and through the circular sets of discs.

References Cited by the Examiner

FOREIGN PATENTS 1,096,517 1/1961 Germany.

LLOYD McCOLLUM, *Primary Examiner.*